J. Edson.
Nail-Extractor.
№ 73587          Patented Jan. 21, 1868.
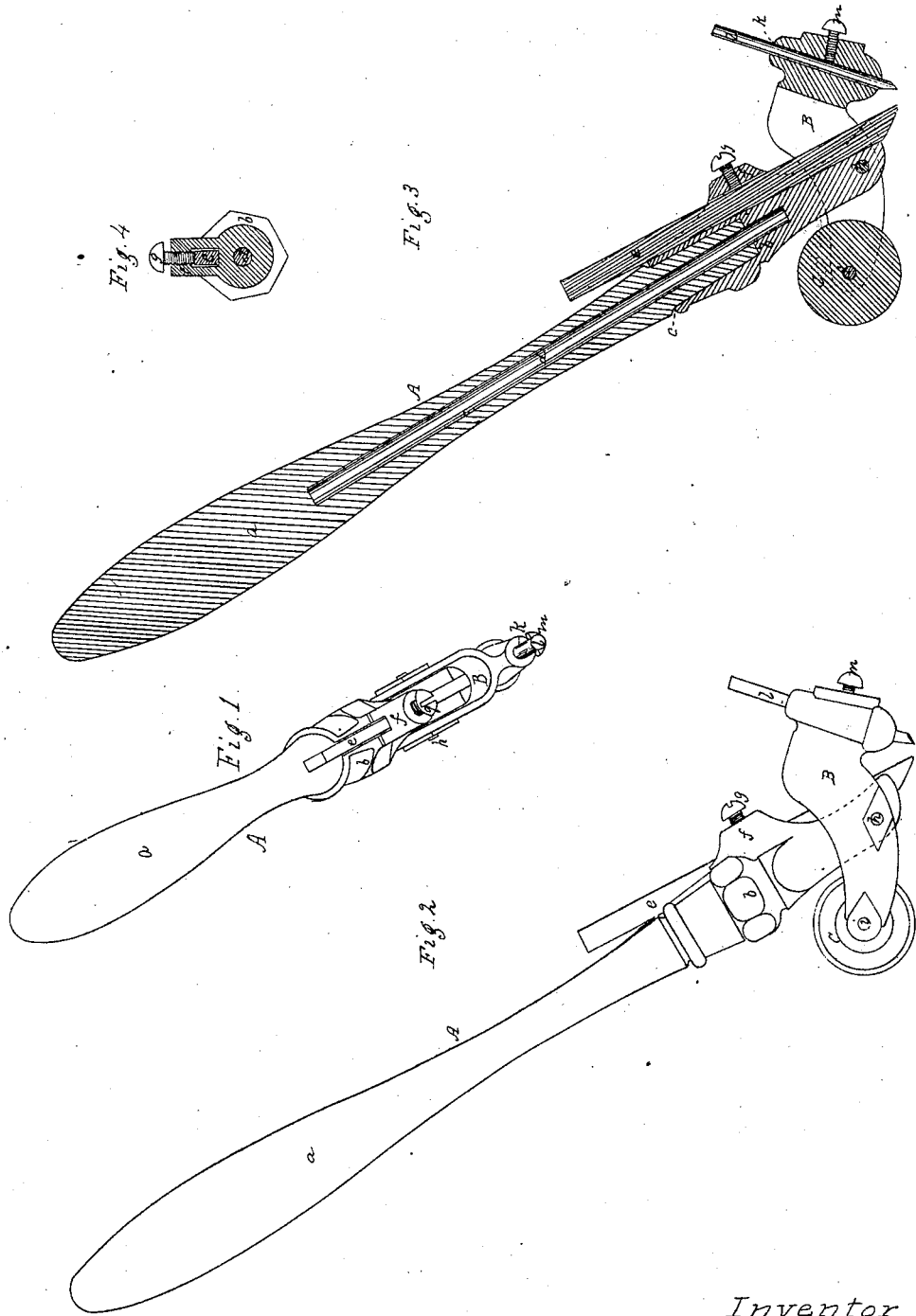
Witnesses
S. N. Piper
Lauritz Müller
Inventor
Jacob Edson
by his attorney
R. H. Eddy

United States Patent Office.

JACOB EDSON, OF BOSTON, MASSACHUSETTS.

Letters Patent No. 73,587, dated January 21, 1868.

IMPROVEMENT IN NAIL-EXTRACTORS.

*The Schedule referred to in these Letters Patent and making part of the same.*

TO ALL PERSONS TO WHOM THESE PRESENTS MAY COME:

Be it known that I, JACOB EDSON, of Boston, in the county of Suffolk, and State of Massachusetts, have invented an Improved Tool or Implement for Drawing Nails; and I do hereby declare the same to be fully described in the following specification, and represented in the accompanying drawings, of which—

Figure 1 is a top view,

Figure 2 a side elevation, and

Figure 3 a vertical and longitudinal section of it.

The implement is intended for the extraction of a nail or spike, and to accomplish the same by a direct lift, so as to bend the nail or spike little if any during the process of its removal from the object from which it may be drawn.

In such drawings, A denotes a lever, composed of a wooden handle, $a$, and a cast-metal socketed head, $b$. The said head is formed with a socket, $c$, at its upper end, to receive the end of the wooden handle, and there projects from the base of the socket a metallic shank, $d$, to extend into the handle longitudinally and give strength to it, the socket serving to prevent the handle from being split by the pressure of it against the shank, while the implement may be in use. The head $b$ also has a socket or groove for receiving a chisel or long adjustable tooth, $e$, such socket being arranged lengthwise in the side of the head, and provided with an arch, $f$, sprung across it, and for receiving a clamp-screw, $g$, which is screwed through the crown of the arch and against the shank of the tooth, and serves to hold the tooth firmly in its socket. The walls or sides of the socket steady the tooth laterally.

Figure 4 is a transverse section of the head $b$, such section being taken through the clamp-screw $g$.

The head of the lever A extends through a furcated lever, B, and is connected thereto by a joint-pin, $h$, which goes through the two, and is arranged in manner as represented. A roller or wheel, C, disposed within one end of the lever B, in manner as shown in the drawings, is connected with the lever by a pin, $i$, going through such lever, the wheel being free to revolve on the pin. Furthermore, at the outer end of the lever is a passage, $k$, which goes down through the lever, and serves to carry another chisel or shanked tooth, $l$, which extends through the passage, and is held in place therein by a clamp-screw, $m$, inserted in the lever, and arranged in manner as represented.

From the above it will be seen that each of the teeth $e\ l$, besides being removable from its carrier, is capable of being adjusted, so as to project more or less therefrom, as circumstances may require, and thus the adjustment of the two teeth, with respect to each other, so as to enable them to grasp the head of a nail to the best advantage, may be easily effected. Each tooth, also, may be removed from its carrier for the purpose of being sharpened.

In order to use the implement for drawing a nail, the tooth $e$ should first be pressed or worked down underneath the head of the nail, after which the lever should be borne downward, so as to cause the other tooth to come in contact with the edge of the nail-head. A further pressure upon the lever will cause the two teeth to take a firm hold of the nail-head, and both to rise, so as to extract the nail, the wheel in the mean time serving as a support for the fulcrum of the lever B. The wheel also prevents the fulcrum from marring or indenting the surface on which the implement is to rest while the extraction of the nail may be in the act of being effected. The wheel also keeps the fulcrum elevated above the said surface, and in consequence of the back-roll or movement of the wheel while the nail is being raised, the tendency of the lever B, while rising upward to bend the nail forward, will be counteracted, and the nail will be lifted nearly if not quite vertically. Thus, it will be seen that the wheel, in conjunction with the lever B, combined with the lever A, (such levers being provided with teeth as specified,) performs very important and useful functions, the whole instrument being a very efficient one for the purpose for which it is intended.

I am aware that it is not new to provide a spike-extracting lever or bar with a separable and adjustable steel "point" or claw, and therefore I make no claim thereto.

I claim the combination of the levers A and B, the wheel C, and the adjustable teeth $e$ and $l$, the whole being constructed, applied, and arranged substantially in manner, and so as to operate as and for the purpose or purposes set forth.

JACOB EDSON.

Witnesses:
R. H. EDDY,
F. P. HALE, Jr.